Oct. 12, 1965  W. WANIELISTA ETAL  3,211,053
AUTOMATIC FOCUSING SYSTEM FOR CAMERA APPARATUS
Filed Dec. 26, 1962  3 Sheets-Sheet 3
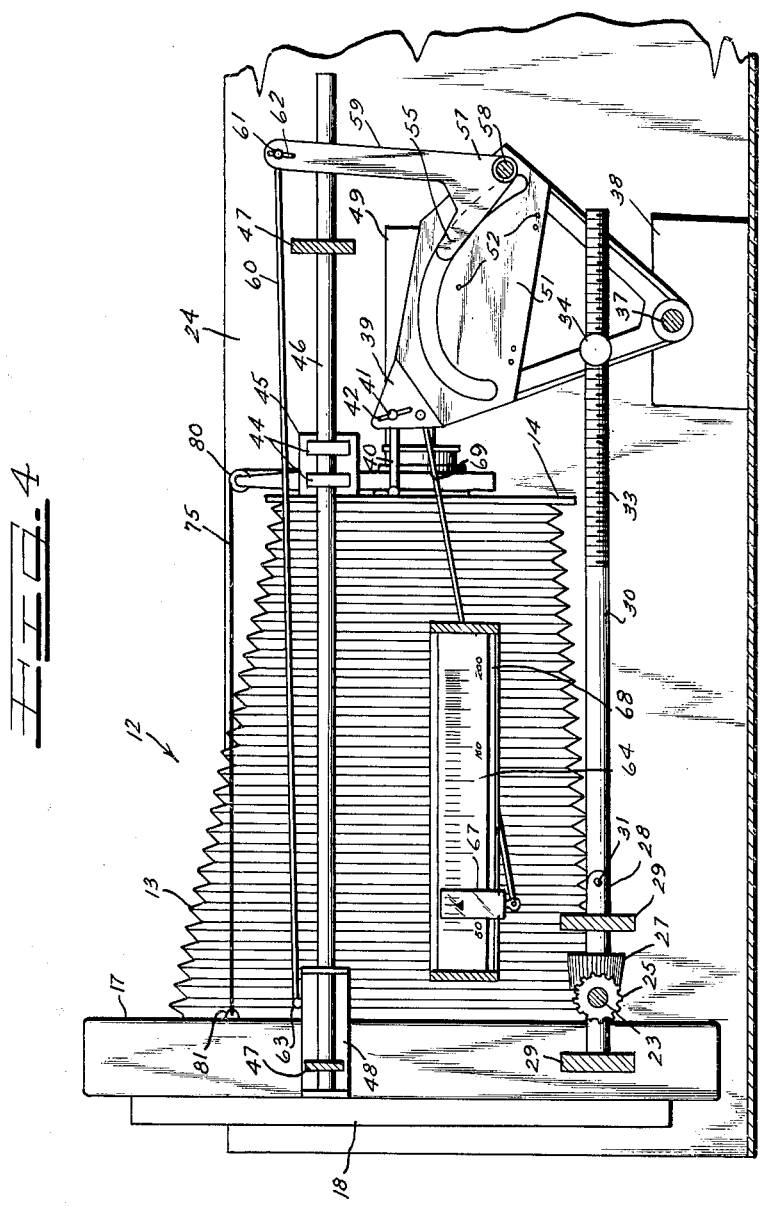
INVENTOR.
Walter Wanielista
Charles P. Sippel Jr.
BY
ATTORNEYS

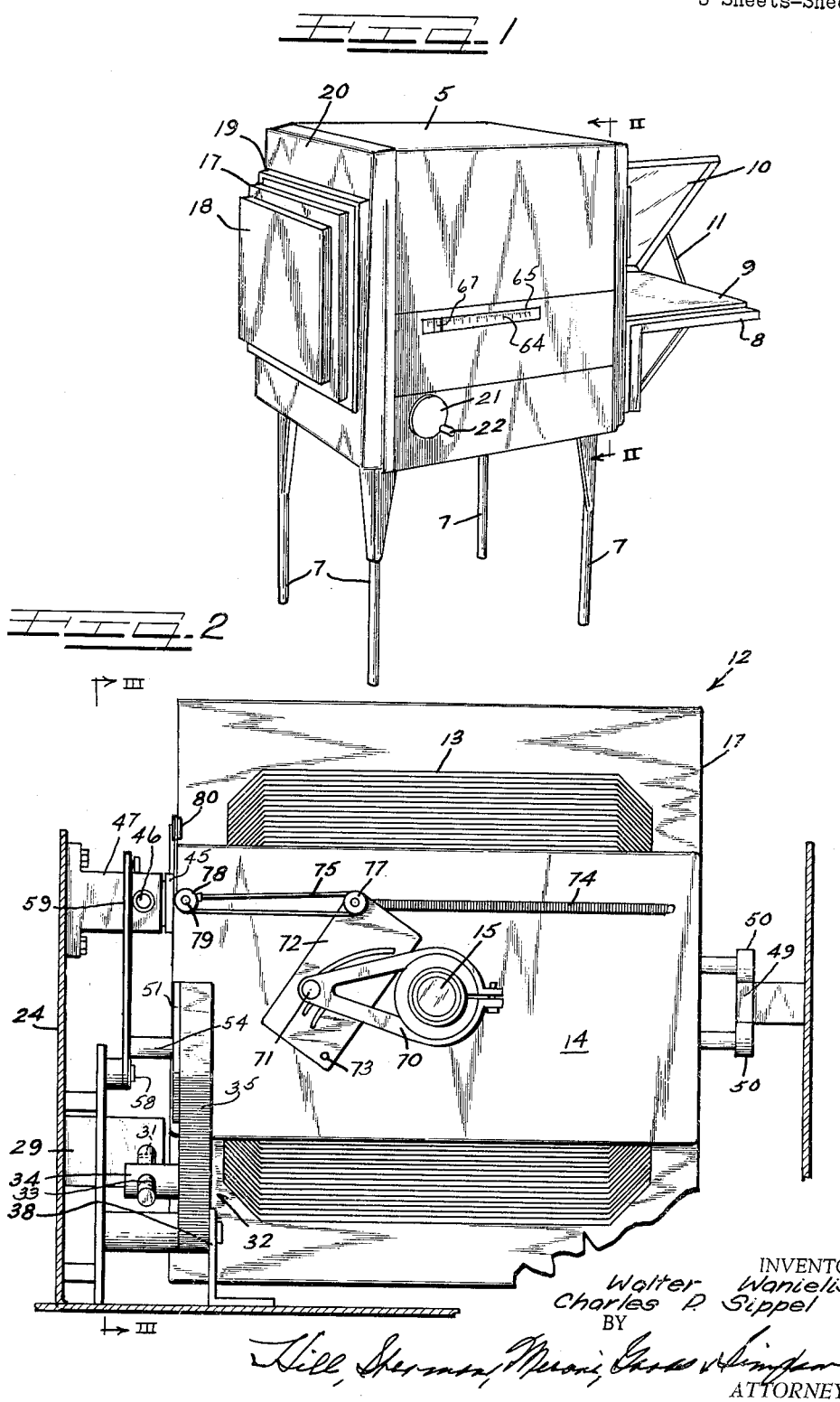

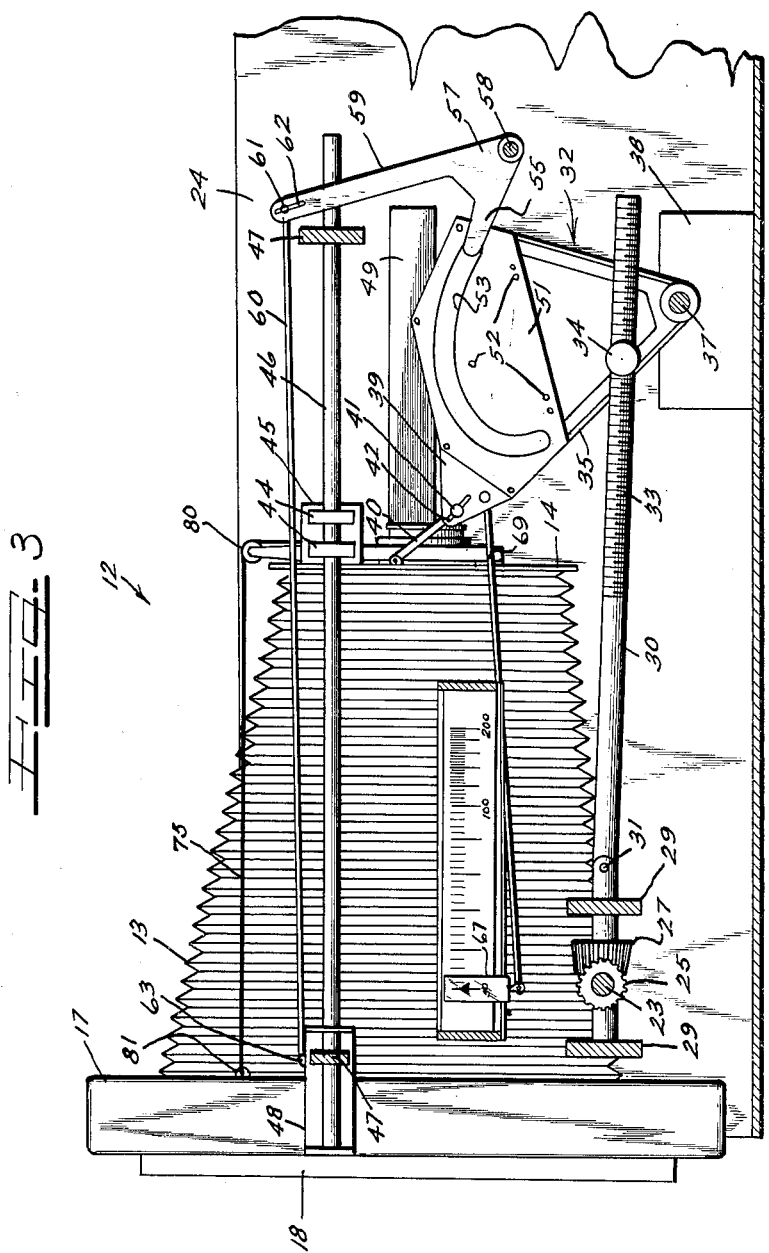

United States Patent Office 3,211,053
Patented Oct. 12, 1965

3,211,053
AUTOMATIC FOCUSING SYSTEM FOR
CAMERA APPARATUS
Walter Wanielista, Weschester, and Charles P. Sippel, Jr., Villa Park, Ill., assignors to Robertson Photo-Mechanix, Inc., Chicago, Ill., a corporation of Illinois
Filed Dec. 26, 1962, Ser. No. 246,961
8 Claims. (Cl. 88—24)

This invention relates to improvements in cameras of the type which are especially useful in producing negative material having utility in offset duplicators, and more particularly concerns a novel automatic focusing system for camera apparatus.

In cameras of the type for producing negative material by photographing document originals, it is necessary to effect proper and accurate camera setting, that is adjustment of the lens distance relative to the camera back, to attain the desired enlargement or reduction of the negative image relative to the original being photographed. This must be accomplished accurately and has generally required considerable dexterity and substantial skill on the part of the operator.

Some attempts have been made to attain at least some element of automatic adjustment. However, prior devices have generally required multiple separate adjustments, and have suffered from looseness in the mechanism, tendency to over-ride, and other deficiencies.

An important object of the present invention is to provide a new and improved automatic focusing system for camera apparatus enabling rapid, accurate, simple focusing adjustment attaining all required adjustments by a single manipulation, requiring no special skill on the part of the operator other than to be able to read an adjustment scale.

Another object of the invention is to provide a new and improved camera focusing system which is unusually direct and positive and free from looseness or any tendency to over-ride.

A further object of the invention is to provide a new and improved camera focusing system which is especially satisfactory for horizontal cameras.

A still further object of the invention is to provide a new and improved compact, low cost, highly efficient camera assembly for use in reproducing documentary material.

Yet another object of the invention is to provide a new and improved automatic focusing system for camera apparatus wherein all adjustments are effected through the operation of a novel cam structure.

Other objects, features and advantages of the present invention will be readily apparent from the following detailed description of a preferred embodiment thereof taken in conjunction with the accompanying drawings, in which:

FIGURE 1 is a perspective view of a camera assembly embodying features of the invention;

FIGURE 2 is an enlarged fragmentary illustrative sectional elevational view taken substantially on the line II—II of FIGURE 1;

FIGURE 3 is a fragmentary sectional elevational illustrative view taken substantially on the line III—III of FIGURE 2; and FIGURE 4 is a view similar to FIGURE 3 but showing the camera and the focusing system in a different adjusted relationship.

In the illustrative camera assembly, a suitable cabinet 5 suitably supported as by means of legs 7 carries on the front thereof a supporting rack 8 adapted to receive thereon for loading a copyboard 9 which includes a glass cover 10 adapted to be held in open position by a collapsible link 11. Documentary material to be copied is clamped within the copyboard 9 which may then be swung up into a vertical position on the front of the cabinet for photographing. If preferred, however, the photographing may be accomplished with the document original held in a horizontal plane with the image reflected by a prismatic or mirror system into a horizontal optical axis in a known manner.

Within the cabinet 5 is housed a camera 12 (FIGS. 2-4) including an extension bellows 13 having on its front end a lens board 14 carrying centrally a suitable photographic lens assembly 15 including the usual adjustable lens opening iris. At its rear end the bellows 13 is secured to a camera back 17 carrying on its rear face portion a quickly replaceable film holder 18. This film holder may be of any preferred type adapted for any desirable reproduction system utilizing cut film, photographic plates, photosensitive paper, and the like. Ready access to the film holder 18 is afforded by exposure of the camera back 17 through an opening 19 framed in a cabinet back 20.

According to the present invention, all adjustments of the camera 12 to attain the proper enlargement or reduction of the original to be reproduced with a given focal length of the lens assembly 15 is attained by a single knob automatic focusing control. For this purpose there is provided externally at one side of the cabinet 5 a focusing control knob 21 (FIG. 1) which is manually rotatable, and for speedy major adjustments desirably carries a handle 22. This adjustment knob 21 is fast on a short shaft 23 which extends through the side wall of the cabinet and is journaled in suitable framework 24 (FIG. 2). At its inner end the shaft 23 carries a bevel gear 25 which drivingly meshes with a bevel gear 27 keyed to a longitudinally extending shaft 28 (FIGS. 2 and 3) rotatably mounted on brackets 29 carried by the framework 24. It will be observed that this mechanism is mounted adjacent to the rear portion of the camera.

Turning of the adjustment knob 21 and, through the bevel gear transmission, turning of the shaft 28 correspondingly turns an adjustment screw rod 30 connected to the forward end of the shaft 28 by means of a flexible connection such as a universal joint 31 and projecting forwardly as an extension from the shaft into operative relation to an adjustment cam assembly 32. For this purpose, the screw rod 30 has a screw threaded portion 33 of substantial length extending threadedly through a follower nut boss member 34 which is freely pivotally attached to a cam rocker carriage 35 and adjacent to a transverse horizontal pivot 37 connecting the lower end of the cam carriage to the framework 24 and a supporting bracket structure 38 on the bottom of the cabinet forwardly from the camera 12. Through this arrangement, rotation of the adjustment screw rod 30 in opposite directions causes the cam carriage to rock in respectively opposite front-to-rear direction as controlled through the adjustment knob 21.

In a practical form, the cam carriage 35 comprises a generaly triangular arm or frame which may be suitably cast in aluminum or the like having a lower apex-like end portion carried by the pivot 37 and widening out toward its top to afford a cam head which on its rear portion has a rearwardly and upwardly extending ear 39 to which is connected a driving link 40 as by means of a pivot connector 41 which is adjustably accommodated by a diagonal slot 42 in the ear. At its opposite end, the link 40 is pivotally connected at 43 to the lens board 14. Through this arrangement, rocking adjustment movements of the carriage member 35 are reflected in corresponding linear adjustments of the lens board 14.

Linear adjustment movements of the lens board 14 are guided at the adjustment mechanism side of the camera by means comprising pillow blocks 44 projecting from a bracket 45 attached to the lens board and slidably engaging upon a longitudinally extending guide rod 46. Support for the guide rod 46 is provided by a pair of pillow blocks 47 carried fixedly adjacent to the front and rear ends of the rod upon the framework 24 and through which the rod is slidably rectilinearly guided. At its rear end portion, the guide rod 46 is fixedly secured to a mounting bracket 48 secured to the camera back 17 which is thereby carried by the guide rod 46 and is rectilinearly reciprocably movable with the guide rod and the bracket 48. At the opposite side of the camera assembly support for the lens board 14 and the camera back 17 is afforded by a fixed longitudinally extending rail 49 engaged by anti-friction means suitably comprising respective sets of rollers 50 mounted on the lens board and the camera back.

Linearly adjustable movement of the camera back 17 enables it to be moved proportionally and in unison with the lens board 14, so that enlargement-reduction settings of the camera can be effected in minimum space. Such proportional, unison adjustment is accomplished by means of the single adjustment mechanism including the cam arm carriage frame 35 which, for this purpose, carries on its head portion a cam structure desirably in the form of a cam plate 51 attached to the head portion of the carriage frame as by means of screws 52 and having formed therein a suitably contoured cam slot 53 extending in a generally front-to-rear direction. Riding in the cam slot 53 is a follower roller 54 mounted on a short generally upwardly and rearwardly extending arm 55 of a bell crank lever member 57 pivotally secured adjacent to its elbow to a fixed pivot 58 which is carried by the framework 24. A longer upwardly extending arm 59 of the bell crank lever projects, in this instance, above the guide rod 46 and has connected to its upper end portion a link rod 60 extending longitudinally rearwardly therefrom. The front end portion of the link rod 60 is attached by means of a pivot connector 61 adjustably in a slot 62 extending longitudinally in the upper end portion of the arm 59. At its rear end, the link rod 60 is attached by means of a pivot connection 63 to the camera back bracket 48.

As will be observed in FIGURES 3 and 4, the cam slot 53 is shaped to generate a curve which is of relatively large radius in its forward portion and of substantially smaller radius in its rear portion, properly calculated to attain the proportional, unison adjustment of the lens board 14 and the camera back 17 for the desired enlargement-reduction setting. The design of the cam slot 53 is such that in the maximum reduction setting of the camera wherein the cam carriage 35 is in its rearmost rocked position, as seen in FIGURE 3, the follower 54 is located in the forward end of the cam slot and the back-adjusting bell crank 57 is in its rearmost rocked position about its pivot 58 which is located suitably forwardly and above the axis of the cam pivot 37. Then, as the cam carriage 35 is rocked forwardly to reduce the degree of reduction setting of the camera, involving extension of the camera bellows 13, there is a unison forward rocking of the bell crank 57 which effects a concurrent forward movement of the camera back 17 by means of the link rod 60 as the lens board 14 is pulled forward by means of the connecting link 40. However, by the particular curve generated in the forward portion of the cam slot 53, the relative forward movement of the camera back 17 effected through the bell crank 57 and the link rod 60 is proportionally less than the forward movement of the lens board 14 through a progressive range until proper spacing is attained between the lens and the camera back for a full size or 1-to-1 copy-image ratio. Adjustment toward this ratio is depicted in FIGURE 4.

At about the point along the length of the cam slot 53 where it merges from the large radius forward portion of the cam slot into the smaller radius portion, a transition occurs in the relative rocking movements of the cam assembly 32 and the bell crank 57, with the bell crank now moving rockably rearwardly progressively in the continued forward rocking of the cam. As a result, a progressive enlargement ratio is automatically attained between the lens and the camera back in a relatively small range of rocking movement of the cam frame arm 35, since the bell crank 57 moves the camera back 17 rearwardly proportionally and in unison with enlargement extension of the lens board 14, to the limit of enlargement adjustment which is attained when the follower 54 reaches the rear end of the cam slot 53.

In the illustrated embodiment, the size and range of rocking movement of the cam assembly 32, the length and shape of the cam slot 53, and the size and shape of the bell crank 57 including the divergence angle of the arms 55 and 59 as well as their length and the pivotal relationship of the bell crank to the cam assembly 32 are so related to the camera 12 as to attain a photographic range of about 50% reduction in photographed image size compared to copy size at one extreme of the adjustment range (that shown in FIGURE 3) to an enlargement size of 200% at the opposite extereme of the adjustment range. Between those exteremes every incremental variation in image size can be accurately attained.

In order to enable the operator to visualize effected camera adjustments externally of the cabinet 5, an automatic scaling system is provided including a slide rule type longitudinally extending scale panel 64 (FIG. 1) exposed through a slot 65 in the cabinet side wall, with a transparent, vertical hair line, indexing member 67 reciprocably adjustable along the scale in unison with the adjustment movements of the cam assembly 32. On the scale 64 are provided suitable graduated index marks identified as to percentage of reduction or enlargement, only the representative numbers "50" indicating 50%, "100" indicating 100% and "200" indicating 200% being shown in FIGURES 3 and 4 due to the limitations of small scale drawing, but it being understood that in practice the scale may have numerous intermediate identifying index numbers. Through this arrangement, registration of the indexing hair line on the member 67 with any of the graduated index marks on the scale 64 affords visual information as to the particular adjustment for which the camera has been set by the adjustment mechanism.

Desirably, the scale panel 64 is supported by a suitable frame structure 68 carried by the supporting framework 24. The frame structure 68 also affords a supporting guideway or track for the indexing member 67. Unison movements of the indexing member 67 with the cam assembly 32 are effected through a link rod 69 extending generally longitudinally and connected at its front end pivotally to the cam frame ear 69 and at its rear end to the indexing member 67.

In addition to automatic proportional and unison adjustments effected in the camera apparatus through the manipulation of the single adjustment control knob 21, as attained by operation of the cam assembly 32 and associated mechanisms and devices, unison and proportional adjustments of the lens opening iris are effected. To this end, an arm 70 of a suitable iris adjusting device is mounted in association with the optical lens system 15 on the lens board 14 (FIG. 2) to swing about the optical axis and has at its outer end portion follower means 71 coacting with suitable cam slots provided in a cam plate 72 mounted adjacent to its lower end by means of a pivot 73 to the lens board 14. Normally the iris adjustment cam plate 72 is biased as by means of a coiled tension spring 74 suitably connected to its upper end portion to swing toward its rocking adjustment limit wherein the iris is adjusted for the maximum reduction capacity of the camera.

In a preferred relationship, iris adjustment is effected in a 4 to 1 ratio in unison with the automatic focusing of the camera, by appropriate movement of the iris adjusting lever arm 70 through the cam plate 72 rockably adjusted by action of the biasing spring 74 in one direction and in the opposite direction by a cable and pulley arrangement associated with the lens board 14 and the camera back 17. For this purpose, a suitable flexible cable 75 is trained over a pulley 77 mounted on the upper end portion of the cam plate 72 with one end of the cable anchored to the lens board 14 as may conveniently be effected onto a pivot pin 78 on which is rotatably mounted a pulley 79 over which the cable is trained in alignment with a pulley 80 mounted thereabove on the upper edge portion of the lens board 14 to clear the cable thereover to run or span rearwardly for connection of its remaining end as by means of a cable terminal connector 81 fixedly to the camera back 17. Through this arrangement, all relative linear adjustments of the lens board 14 and the camera back 17 are reflected in unison proportional iris opening adjustments.

It will thus be apparent that provision has been made for automatically effecting all adjustments needed for attaining accurate enlargement-reduction settings throughout the susbtantial range of the camera by the manipulation of a single manual operating element, namely the adjustment control knob 21 which, through the positive action of the associated connecting screw transmission operates the accurately and positively functioning cam-lever-linkage camera adjusting mechanism and the unison responsive iris adjusting system of the camera. All this is accomplished in unusually compact space requirements and attains highly satisfactory positive camera focusing action. Because of the compact nature of the adjustment mechanism which can all be accommodated along one side of the camera, ample room is afforded within the compact housing 5 for not only a wide range adjustment extension of the camera, but ample room is also provided for copy illuminating lighting means within the cabinet.

By virtue of the adjustment slot 42 in the cam frame ear 39 for the link connection 41, and the adjustment slot 62 in the lever arm 59 for the link connection 61, suitable adjustments can be readily effected to accommodate camera lenses of different focal lengths. This substantially increases the versatility of the camera.

It will be understood that modifications and variations may be effected without departing from the scope of the novel concepts of the present invention.

We claim as our invention:

1. In a camera structure,
supporting means,
a camera including a bellows having at one end a lens board and at the opposite end a camera back,
means mounting the lens board and the camera back on said supporting means each for relative linear adjustment movement with respect to each other and with respect to said supporting means, a cam member oscillatably mounted on said supporting means on a pivotal axis which is transverse to the axis of said linear adjustment movement,
means connecting said cam member to said lens board so that oscillations of the cam member effect corresponding linear adjustments of said lens board,
means for oscillatably actuating said cam member,
a lever member oscillatably mounted on said supporting means on a pivotal axis transverse to said axis of said linear adjustment and having a connection with said camera back whereby oscillations of the lever effect corresponding linear adjustments of the camera back,
a cam surface of predetermined profile on said cam member,
and a follower on said lever member engaging said cam surface and operating to effect predetermined camera back adjustment movements of the lever member in unison with lens board adjustment movements of the cam member.

2. In a camera structure including supporting means and a camera comprising a bellows having a lens carrying member at one end and a camera back at the opposite end with means mounting said member and back on said supporting means for relative linear adjustment movement,
an adjustment member movably mounted on said supporting means,
actuating means connected to said adjustment member for adjustably moving the adjustment member,
means connecting the adjustment member to said lens carrying member,
means connecting the adjustment member to the camera back,
said connecting means being operative in the adjustment movements of said adjustment member to move said lens carrying member and said camera back relatively adjustably in unison,
iris opening adjustment mechanism carried by the lens carrying member,
and means providing an adjustment connection between the iris opening adjustment mechanism and the camera back effecting unison actuation of the iris adjustment mechanism with relative adjustments of the lens carrying member and the camera back as effected through said adjustment member.

3. In a camera structure including a lens board and a camera back connected by a bellows,
supporting means carrying both of said board and said back for unison frontward and rearward linear adjustments relative to each other and to said supporting means,
a cam arm pivotally mounted for frontward and rearward rocking movements on a fixed axis on said supporting means adjacent to said lens board and transverse to the direction of movement of said board and back,
means connecting said cam arm and said lens board for unison movement,
said cam arm having a cam portion providing a cam slot extending in a generally front-to-rear direction,
a bell crank having an elbow pivotally mounted on said supporting means on a fixed axis parallel to said arm axis and adjacent to said cam portion and having a follower arm provided with a follower riding in said cam slot and a lever arm diverging from said follower arm,
link means connecting said lever arm to said camera back,
and means for adjustably rockably motivating said cam arm whereby to effect direct adjustment movements of the lens board by rocking of the cam arm and to effect adjustments of the camera back by pivotal movements of the bell crank as effected by coaction of the follower with the cam portion in said cam slot.

4. In an automatic focusing system for camera apparatus including a camera having a bellows with a lens board at one end and a camera back at the other end and means supporting each of the lens board and the camera back for relative linear focusing adjustment with respect to each other and to the supporting means,
a rocking cam member mounted on the supporting means and providing a guiding cam surface,
means connecting the rocking cam member directly to the lens board for unison movement linearly of the lens board with rocking movements of the cam member,
a bell crank rockably mounted on the supporting means spaced from but adjacent to said cam member and having an arm with a follower operatively engaging the cam surface and a lever arm diverging from the follower arm,
means connecting the lever arm with said camera back for adjustment movements of the camera back responsive to rocking movements of the bell crank,
and means for adjustably rocking the cam member and thereby through said cam surface and said follower adjustably rocking the bell crank.

5. In a camera structure including supporting means and a camera comprising a bellows having a lens carrying member at one end and a camera back at the opposite end with means mounting each of said member and back on said supporting means for relative linear adjustment movement, an adjustment cam member rockably mounted on said supporting means independently of said camera, a link connected at one end to the cam member and at its opposite end to the lens carrying member for direct linear adjustment movements of the lens carrying member in the rocking movements of the cam member, means including a bell crank pivotally rockably mounted on said supporting means adjacent to but independently of said cam member and spaced from the camera with a short arm carrying a cam follower operatively associated with the cam member and a longer arm connected to the camera back for adjustably moving the camera back proportionally and in unison with adjustment of the lens carrying member by said link in the rocking movements of the cam member, and means for rockably actuating said cam member.

6. A camera structure as defined in claim 5, wherein said means for rockably actuating the cam member comprise an adjustment screw rod, means for rotatably actuating the screw rod, a follower nut structure freely pivotally mounted on said cam member and threadedly engaging said adjustment screw rod, whereby turning of the screw rod runs said follower nut structure therealong and thereby effects adjustment rocking movements of the cam member.

7. A camera structure as defined in claim 5, wherein said cam member has a cam surface developed to effect proportional unison rocking movements of the cam member and the bell crank in the same direction within a reduction range of adjustment of the lens board and the camera back and to effect proportional unison rocking movements of the cam member and the lever member in the opposite rocking direction to effect relative enlargement movements of the lens board and the camera back.

8. A camera structure including a housing, a camera within said housing including a bellows having at one end a lens board and at the opposite end a camera back, means in said housing for supporting and guiding the lens board and the camera back in a rectilinear path and means on the lens board and the camera back coacting with said guiding means to afford guided rectilinear movement of both the lens board and camera back along said guiding means, a rocker arm mounted pivotally in said housing for rocking movement in a plane parallel to and at one side of the path of movement of the lens board and camera back, a first link connecting said arm remote from the arm pivot to said lens board, a second link connected to said arm adjacent to said first link, an index scale carried observably by the housing and having a movable indexing member associated therewith and connected to said second link, a cam on said arm adjacent to said links, a bell crank pivotally mounted in said cabinet adjacent to said cam and rockably movable in a plane parallel to said arm, a follower on said bell crank engaging said cam and operable in rocking movements of the arm to rock the bell crank in predetermined unison relation, a third link connected at one end to the bell crank and at its opposite end to the camera back, iris adjustment mechanism mounted on the lens carrying member, means connecting the iris adjustment mechanism with said camera back for adjustment actuation of the iris adjustment mechanism in response to relative movements of the camera back and lens board, whereby through said rocking adjustment of the arm unison simultaneous adjustments are effected of the lens board through said first link, said index member through said second link, said camera back through said third link and said iris adjustment mechanism through said means connecting the same to the camera back as a result of adjustment movements of the camera back and lens board.

References Cited by the Examiner

UNITED STATES PATENTS

| 1,266,111 | 5/18 | Evans | 88—24 |
| 1,325,154 | 12/19 | Hopkins | 88—24 |
| 1,418,690 | 6/22 | Thurber | 88—24 |
| 2,258,635 | 10/41 | Uffrecht | 95—45 |
| 2,418,230 | 4/47 | Jacobson | 88—24 |
| 3,105,410 | 10/63 | Clapp. | |

NORTON ANSHER, *Primary Examiner.*

JOHN M. HORAN, *Examiner.*